(12) United States Patent
Gollier

(10) Patent No.: US 7,576,867 B2
(45) Date of Patent: Aug. 18, 2009

(54) POSITION SENSITIVE DETECTORS IN WAVELENGTH MONITORING

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 198 days.

(21) Appl. No.: 11/880,251

(22) Filed: Jul. 20, 2007

(65) Prior Publication Data

US 2009/0021733 A1    Jan. 22, 2009

(51) Int. Cl.
*G01B 9/02* (2006.01)
*G01J 3/45* (2006.01)

(52) U.S. Cl. ...................... 356/480; 356/454
(58) Field of Classification Search ................ 356/450, 356/454, 480, 519
See application file for complete search history.

(56) References Cited

U.S. PATENT DOCUMENTS

| | | | | |
|---|---|---|---|---|
| 5,598,300 | A | 1/1997 | Magnusson et al. ......... | 359/566 |
| 6,812,452 | B2 * | 11/2004 | Tsai ........................... | 250/226 |
| 6,858,834 | B2 * | 2/2005 | Tsai ........................... | 250/226 |
| 6,885,462 | B2 * | 4/2005 | Lee et al. .................... | 356/519 |
| 6,985,664 | B2 | 1/2006 | Caracci et al. .............. | 385/130 |
| 2004/0239939 | A1 | 12/2004 | Guerineau et al. .......... | 356/454 |
| 2005/0046839 | A1 | 3/2005 | Harnisch .................... | 356/328 |
| 2005/0074204 | A1 | 4/2005 | Wilson et al. ................ | 385/24 |
| 2007/0153839 | A1 | 7/2007 | Varming et al. ............... | 372/6 |

* cited by examiner

*Primary Examiner*—Michael A Lyons
(74) *Attorney, Agent, or Firm*—Kwadjo Adusei-Poku

(57) ABSTRACT

Particular embodiments of the present invention relate generally to wavelength monitoring in frequency doubling and other optical applications. According to one embodiment of the present invention, a system for monitoring the wavelength of a light source is provided. The system comprises a light directing section, an optical vector generator, and one or more position sensitive detectors. The optical vector generator comprises a grating coupled waveguide configured to exhibit a reflective or transmissive optical resonance effect in response to variable wavelength input light. The optical resonance effect comprises a wavelength-dependent output vector that is generated from a localized output vector area of the grating coupled waveguide in response to variable wavelength input light. The position of the localized output vector area along a dimension of the grating coupled waveguide varies with the wavelength of the variable wavelength input light. The position sensitive detector is positioned in the optical path of the wavelength-dependent output vector and is configured to facilitate generation of a signal indicative of the position of the localized output vector area along the dimension of the grating coupled waveguide. Additional embodiments are disclosed and claimed.

19 Claims, 2 Drawing Sheets

POSITION SENSITIVE DETECTORS IN WAVELENGTH MONITORING

BACKGROUND OF THE INVENTION

The present invention relates generally to wavelength monitoring and control in semiconductor lasers and other wavelength-tunable light sources. More particularly, the present invention relates to the use of position sensitive detectors to facilitate wavelength monitoring and control in semiconductor lasers and other wavelength-tunable light sources.

SUMMARY OF THE INVENTION

Semiconductor lasers may be configured in a variety of ways. For example and by way of illustration, not limitation, short wavelength sources can be configured for high-speed modulation by combining a single-wavelength semiconductor laser, such as a distributed feedback (DFB) laser, a distributed Bragg reflector (DBR) laser, or a Fabry-Perot laser with a light wavelength conversion device, such as a second harmonic generation (SHG) crystal. The SHG crystal can be configured to generate higher harmonic waves of the fundamental laser signal by tuning, for example, a 1060 nm DBR or DFB laser to the spectral center of the SHG crystal, which converts the wavelength to 530 nm.

The wavelength conversion efficiency of an SHG crystal, such as MgO-doped periodically poled lithium niobate (PPLN), is strongly dependent on the wavelength matching between the laser diode and the SHG device. As will be appreciated by those familiar with laser design, DFB lasers are resonant-cavity lasers using grids or similar structures etched into the semiconductor material as a reflective medium. DBR lasers are lasers in which the etched grating is physically separated from the electronic pumping area of the semiconductor laser. SHG crystals use second harmonic generation properties of non-linear crystals to frequency double laser radiation.

The present inventors have recognized that wavelength control in wavelength-tunable light sources using wavelength conversion devices is important because the bandwidth of a PPLN SHG device is often very small—for a typical PPLN SHG wavelength conversion device, the full width half maximum (FWHM) wavelength conversion bandwidth is only in the 0.16 to 0.2 nm range and mostly depends on the length of the crystal. In addition, the present inventors have recognized that wavelength control in semiconductor lasers in general is often important because mode hopping and uncontrolled large wavelength variations within the laser cavity can cause the output wavelength of a semiconductor laser to move during operation. In the case of a wavelength-converted light source, once the semiconductor laser wavelength deviates outside the wavelength conversion bandwidth of the PPLN SHG device, the output power of the conversion device at the target wavelength drops. In laser projection systems, for example, these drops in output power are particularly problematic because they can generate instantaneous changes that will be readily visible as defects at specific locations in the image. These visible defects typically manifest themselves as organized, patterned image defects across the image because the generated image is simply the signature of the temperature evolution of the different sections of the laser.

In frequency doubling applications, the conversion efficiency of the wavelength conversion device can be very sensitive to wavelength variations and the present inventor has recognized the need for monitoring wavelength to help compensate for real time power fluctuations of the frequency doubled light due to wavelength fluctuations. By monitoring the wavelength, it is possible to detect those variations and compensate for them. As an example, current injected into an IR laser can be increased to compensate for a drop in conversion efficiency. Additionally, or alternatively, if a wavelength variation larger than the free spectral range of the laser is detected, the laser can be reset to zero over a short period of time in order to force the choice of a mode that is closer to the nominal wavelength defined by the DBR section of the laser.

According to one embodiment of the present invention, a system for monitoring the wavelength of a light source is provided. The system comprises a light directing section, an optical vector generator, and one or more position sensitive detectors. The light directing section is configured to direct at least a portion of light generated by a light source toward the optical vector generator as variable wavelength input light. The optical vector generator comprises a grating coupled waveguide positioned in the optical path of the variable wavelength input light. The grating coupled waveguide is configured to exhibit a reflective or transmissive optical resonance effect in response to the variable wavelength input light. The optical resonance effect comprises a wavelength-dependent output vector that is generated from a localized output vector area of the grating coupled waveguide in response to variable wavelength input light. The position of the localized output vector area along a dimension of the grating coupled waveguide varies with the wavelength of the variable wavelength input light. The position sensitive detector is positioned in the optical path of the wavelength-dependent output vector and is configured to facilitate generation of a signal indicative of the position of the localized output vector area along the dimension of the grating coupled waveguide.

According to another embodiment of the present invention, an optical package comprising a wavelength-tunable semiconductor laser, a wavelength conversion device, and system for monitoring the wavelength of the semiconductor laser is provided. The monitoring system comprises a light directing section, a wavelength-dependent optical vector generator, one or more position sensitive detectors, and a controller. The controller is configured to tune the wavelength of the wavelength-tunable light source, a conversion bandwidth of the wavelength conversion device, or both, in response to the output vector position signal generated by the position sensitive detector.

Although the concepts of the present invention are described primarily in the context of image forming, it is contemplated that various concepts of the present invention may also be applicable to any light source application where fluctuation of the wavelength of the light source could be a problem.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
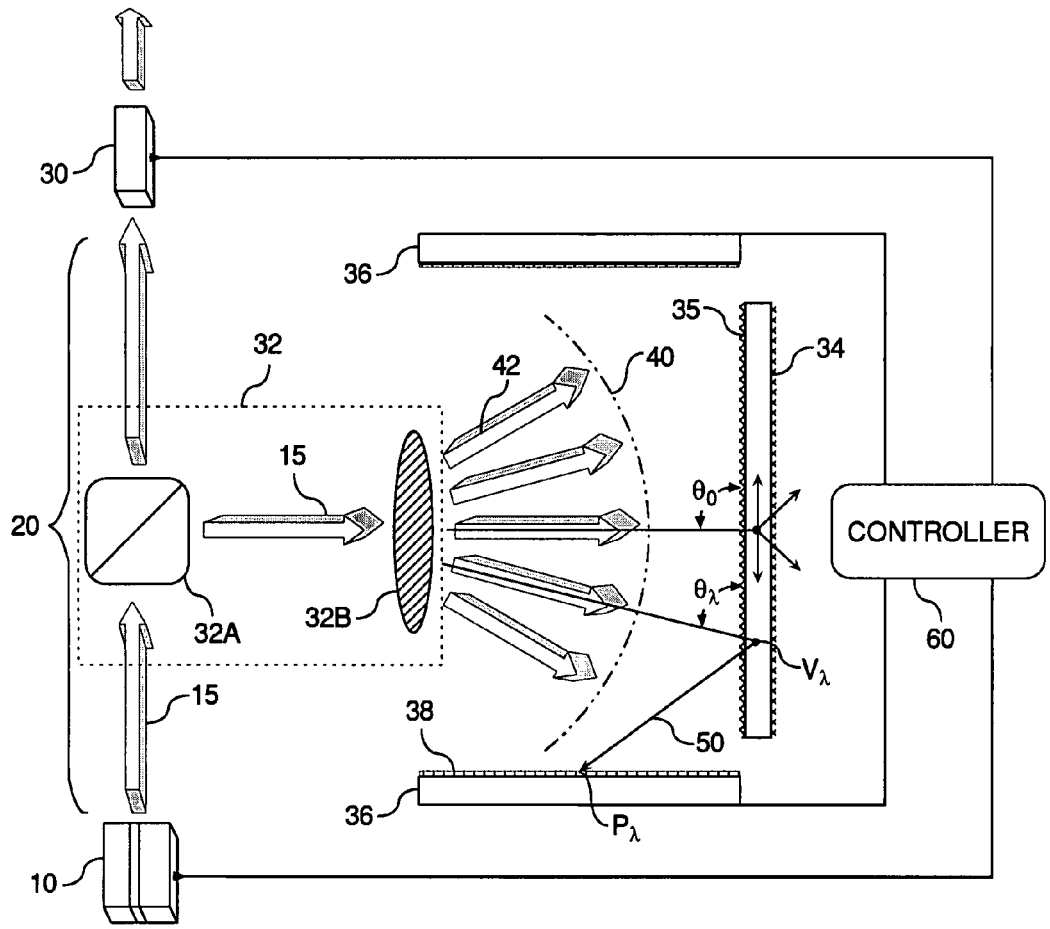
FIG. 1 is a schematic illustration of an optical package comprising a wavelength-tunable semiconductor laser, a wavelength conversion device, and a system for monitoring the wavelength of the semiconductor according to one embodiment of the present invention.

Referring initially to FIG. 1, particular features of some embodiments of the present invention can be illustrated with reference to an optical package comprising a wavelength-tunable semiconductor laser 10, a wavelength conversion device 20, and system 30 for monitoring the wavelength of the semiconductor laser 10. Generally, the monitoring system 30 comprises a light directing section 32, an optical vector generator 34, and one or more position sensitive detectors 36.

The light directing section 32, which is illustrated schematically as a beam splitter 32A and optical lens 32B in FIG. 1, is configured to direct at least a portion of light 15 generated by the semiconductor laser 10 toward the optical vector generator 34. The light 15 generated by the semiconductor laser 10 is referred to herein as variable wavelength input light because its wavelength is subject to variation as a result of the aforementioned mode hopping, thermal patterning effects, etc. For the purposes of describing and defining the present invention, it is noted that the phrase variable wavelength input light also refers to propagating light of a wavelength that merely varies from a stated reference or target value but does not necessarily change in value over time, as would be the case in the context of mode hopping.

In the illustrated embodiment, the optical vector generator 34 comprises a grating coupled waveguide and is positioned in the optical path of the variable wavelength input light 15 and exhibits a reflective optical resonance effect in response to the variable wavelength input light 15. Although the structure, function, and properties of a variety of grating coupled waveguides suitable for use in the present invention can be gleaned from literature on the subject, it is noted that grating coupled waveguides generally reflect light only when the incident light has one specific angle of incidence and one specific wavelength, a property that does not require long optical path lengths commonly associated with conventional spectrometers. Typically, the optical path of the system, measured from the wavelength-tunable light source 10 to the wavelength conversion device 20, and including the optical vector generator 34 and the position sensitive detector 36, is less than approximately 100 mm, and can be as small as 15 mm or less. Generally, the light directing section 32, the optical vector generator 34, and the position sensitive detector 36 contribute less than approximately 50 mm to the overall optical path length of the system, or in some cases as little as 5 mm.

Accordingly, in general, grating coupled waveguides are particularly well-suited for applications where a compact wavelength monitored light source is required or where the light source is to be contained within a common housing, as a portable unit, i.e., one which can be readily transported or moved by a person without the assistance of machinery. It is also noted that the concepts of the present invention are not limited to particular optical vector generators, or to only those grating coupled waveguide designs currently taught in the literature.

The optical resonance effect generated in the grating coupled waveguide 34 comprises a wavelength-dependent output vector 50 that is generated from a localized output vector area $V_\lambda$ of the grating coupled waveguide 34 in response to the variable wavelength input light 15. The position of the localized output vector area $V_\lambda$ along the grating coupled waveguide 34 varies with the wavelength of the variable wavelength input light 15. Accordingly, the position sensitive detector 36 can be used to determine the wavelength of the variable wavelength input light 15 by positioning the detector 36 in the optical path of the wavelength-dependent output vector 50 and using the position signal generated by the detector as an indication of wavelength.

More specifically, in the embodiment of the present invention illustrated in FIG. 1, the light directing section 32 is configured to direct the variable wavelength input light 15 toward the optical vector generator 34 as a curved wave front 40 comprising a plurality of distinct vector components 42. In practicing particular embodiments of the present invention, the wave front 40 may be formed by diverging radiation, as is illustrated in FIG. 1, or converging radiation. Given the curved wave front 40, the angle of incidence of the input light 15 over the optical vector generator 34 varies along a lateral dimension of the input face 35 of the optical vector generator 34. Because the optical vector generator 34 is a resonant structure, such as a grating coupled waveguide, the optical vector generator 34 will exhibit reflective optical resonance effects, but the optical resonance will only be exhibited at a specific angle of incidence $\theta_\lambda$, i.e., an angle corresponding to the wavelength of the input light 15. Accordingly, given a specific input wavelength $\lambda$, an optical resonance effect will only be exhibited at a corresponding angle of incidence $\theta_\lambda$ and not at other angles of incidence, e.g., $\theta_0$. As a consequence, the output vector 50 is wavelength-dependent and is generated from a localized output vector area $V_\lambda$ of the optical vector generator 34, the particular location of which depends on the wavelength of the input light 15.

Although the location of the localized output vector area $V_\lambda$ can be deduced, measured, approximated, or otherwise determined in a variety of ways, according to one embodiment of the present invention, the wavelength of the input light 15 can be determined by inserting one or more position sensitive detectors 36 in the path of the wavelength-dependent output vector 50 and using the following approximated formula:

$$\eta_{eff} + m(\lambda/\Lambda) = \theta_{AVG} + x/R$$

where, $\eta_{eff}$ is the effective index of the waveguide, m is an integer number (positive or negative), $\lambda$ is the wavelength of the input light 15, $\Lambda$ is the grating period, $\theta_{AVG}$ is the average incidence angle, x is the position of the resonance, and R is the radius of curvature of the incidence wave. The position x of the resonance can be determined by using the position sensitive detector 36 to generate a signal indicative of a position $P_\lambda$ of the wavelength-dependent output vector 50 on an input face 38 of the position sensitive detector 36. Based on the above-noted formula, any wavelength variation will result in a beam shift dx given by:

$$dx = Rm(d\lambda/\Lambda)$$

Accordingly, large beam displacements can be achieved for small wavelength variations by using a curved wave front 40 with a relatively large radius of curvature R.

The position sensitive detector 36 may comprise any conventional or yet to be developed detector and may define a variety of input face 38 configurations. For example, and not by way of limitation, the position sensitive detector may comprise one or more photosensitive detector arrays 36 defining respective planar input faces 38 positioned to receive the wavelength-dependent output vector 50 as it is generated over a range of angles and from a range of positions at the optical vector generator 34. The aforementioned correlation of the angle of incidence $\theta_\lambda$ and the wavelength $\lambda$ of the variable wavelength input light can be executed in a variety of ways including, but not limited to, the use of geometric algorithms, lookup tables, etc.

Figure 2:
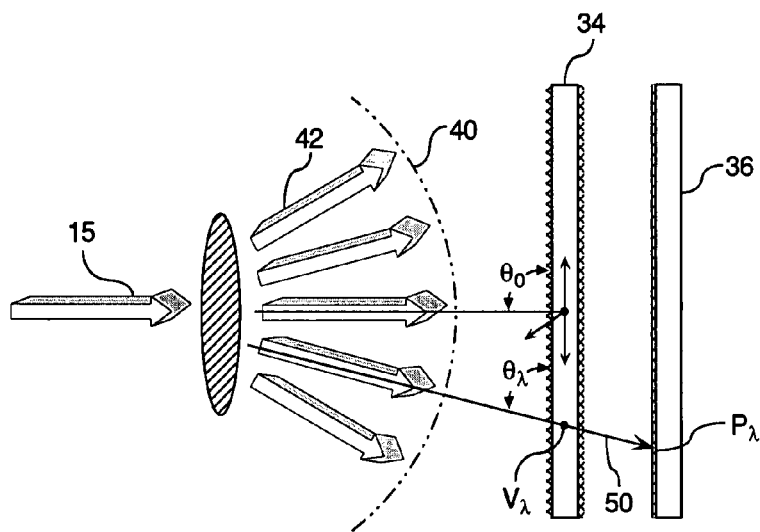
FIG. 2 is a schematic illustration of a system for monitoring the wavelength of the semiconductor according to another embodiment of the present invention.

Referring collectively to FIGS. 1 and 2, it is noted that the optical vector generator 34 may comprise a grating coupled waveguide and may be configured to exhibit a reflective optical resonance effect, as is illustrated in FIG. 1, or a transmissive optical resonance effect, as is illustrated in FIG. 2, in response to the variable wavelength input light 15. In either case, the optical vector generator is configured such that the reflective or transmissive optical resonance effect comprises a wavelength-dependent output vector 50 that can be used to correlate the angle of incidence $\theta_\lambda$ and the wavelength $\lambda$ of the variable wavelength input light in the manner described above.

In the embodiment of the present invention illustrated in FIG. 1, the optical vector generator 34 comprises a substantially uniform spatial grating profile while the variable wavelength input light 15 comprises a plurality of distinct component vectors 42 defining a curved wave front 40 and variable propagation vector profile. In contrast, referring to the embodiment of the present invention illustrated in FIG. 3, the optical vector generator 34 can alternatively be configured to comprise a spatial grating profile that varies as a function of position on the input face of the optical vector generator 34 while the variable wavelength input light 15 comprises a plurality of distinct component vectors 42 defining a planar wave front 40 and a substantially uniform propagation vector profile. As a result, in the embodiment of FIG. 3, spatial position along the optical vector generator forms the basis for the wavelength correlation because the spatial position $P_1$, $P_2$, $P_i$ at which the wavelength-dependent output vector is generated varies as a function of wavelength of the variable wavelength input light.

Figure 3:
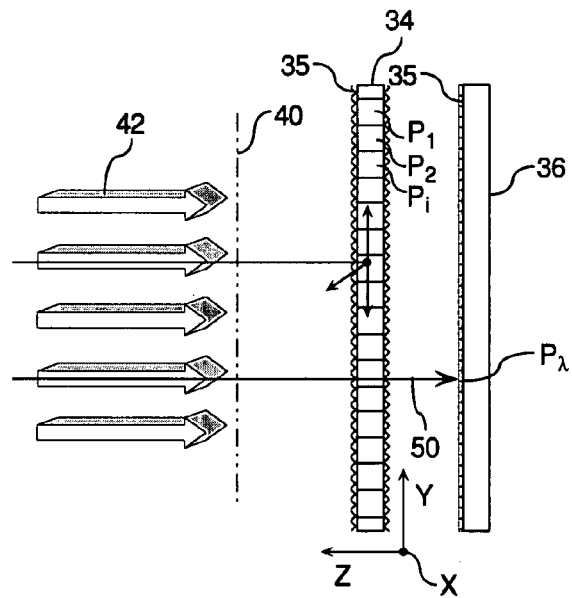
FIG. 3 is a schematic illustration of a system for monitoring the wavelength of the semiconductor according to yet another embodiment of the present invention.

More specifically, referring to FIG. 3, a light directing section is configured to direct variable wavelength input light toward the optical vector generator 34 as a substantially planar wave front 40 comprising a plurality of distinct component vectors 42 defining a planar wave front 40 and a substantially uniform propagation vector profile. The optical vector generator 34 is configured such that the wavelength-dependent output vector 50 is generated at a specific spatial position $P_1$, $P_2$, $P_i$ on an input face 35 of the optical vector generator 34. The position $P_\lambda$ of the wavelength-dependent output vector 50 on the input face 38 of the position sensitive detector 36 can be correlated with the spatial position $P_1$, $P_2$, $P_i$ on the input face 35 of the optical vector generator 34 and the wavelength of the variable wavelength input light because the spatial position $P_1$, $P_2$, $P_i$ at which the wavelength-dependent output vector 50 is generated is a function of the wavelength $\lambda$ of the variable wavelength input light 15.

Figure 4:
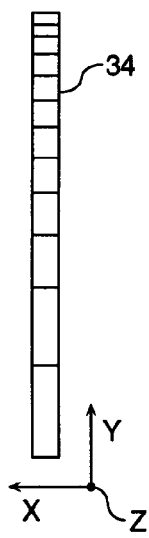
FIGS. 4-6 are schematic illustrations of alternative optical vector generators suitable for use within the scope of particular embodiments of the present invention.
Figure 5:
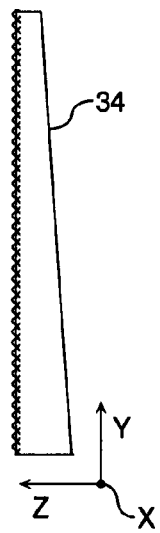
Figure 6:
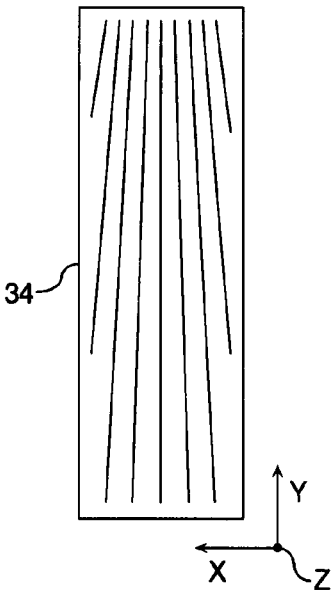

For example, and not by way of limitation, FIGS. 4-6 present schematic illustrations of number of grating coupled waveguide optical vector generators suitable for use within the scope of the embodiment illustrated in FIG. 3. Specifically, the optical vector generator 34 can be configured to comprise a spatial grating profile that varies as a function of position on the input face of the optical vector generator 34 by providing: a chirped grating, where the period of the grating varies in the Y direction across the length of the optical vector generator 34 (see FIG. 4); a thickness modified grating, where effective index variations are incorporated into the grating structure by modifying the thickness of the waveguide portion of the grating coupled waveguide along the Y direction (see FIG. 5); or a non-parallel grating, where the grating period is varied by incorporating non-parallel grating lines along the length of the optical vector generator in the Y direction (see FIG. 6).

Returning to FIG. 1, particular embodiments of the present invention will be applicable in the context of an optical package comprising a wavelength-tunable light source 10 and a controller 60 configured to tune the wavelength of the wavelength-tunable light source in response to the output vector position signal generated by the position sensitive detector 36. Alternatively, or additionally, the controller 60 can be configured to tune the conversion bandwidth of the wavelength conversion device 30 in response to the output vector position signal. Although the illustrated embodiment shows sampling of the variable wavelength input light 15 upstream of the wavelength conversion device 30, it is also contemplated that the light directing section 32 can be configured to sample a portion of light generated by the wavelength tunable light source downstream of the wavelength conversion device 30, where the wavelength of the frequency converted light can be measured. It is further contemplated that downstream sampling can also be executed by detecting residual IR light at the output of the wavelength conversion device 30.

It is to be understood that the preceding detailed description of the invention is intended to provide an overview or framework for understanding the nature and character of the invention as it is claimed. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

For example, although the various concepts of the present invention are described in the context of semiconductor lasers, it is contemplated that particular aspects of the present invention will be applicable to a variety of lasing and non-lasing light sources subject to wavelength variation or error.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

In addition, recitations herein of a component of the present invention being "configured" in a particular way or to embody a particular property or function, are structural recitations as opposed to recitations of intended use. For example, references herein to a light directing section being "configured" to direct light towards the optical vector generator denotes an existing physical condition of the light directing section and, as such, is to be taken as a definite recitation of the structural characteristics of the light directing section.

For the purposes of describing and defining the present invention it is noted that the terms "substantially" and "approximately" are utilized herein to represent the inherent degree of uncertainty that may be attributed to any quantitative comparison, value, measurement, or other representation.

What is claimed is:

1. A system for monitoring the wavelength of a light source, the system comprising a light directing section, an optical vector generator, and one or more position sensitive detectors, wherein:
   the light directing section is configured to direct at least a portion of light generated by a light source toward the optical vector generator as variable wavelength input light;
   the optical vector generator comprises a grating coupled waveguide positioned in the optical path of the variable wavelength input light;
   the grating coupled waveguide is configured to exhibit a reflective or transmissive optical resonance effect in response to the variable wavelength input light;
   the optical resonance effect comprises a wavelength-dependent output vector that is generated from a localized output vector area of the grating coupled waveguide in response to variable wavelength input light;
   the position of the localized output vector area along a dimension of the grating coupled waveguide varies with the wavelength of the variable wavelength input light; and
   the position sensitive detector is positioned in the optical path of the wavelength-dependent output vector and is configured to facilitate generation of a signal indicative of the position of the localized output vector area along the dimension of the grating coupled waveguide.

2. A system as claimed in claim 1 wherein the light directing section is configured to direct variable wavelength input light toward the optical vector generator as a curved, diverging or converging wave front comprising a variable propagation vector profile.

3. A system as claimed in claim 2 wherein the grating coupled waveguide is configured to exhibit the reflective or transmissive optical resonance effect at a given angle of incidence comprised within the variable propagation vector profile of the variable wavelength input light.

4. A system as claimed in claim 2 wherein the optical vector generator comprises a grating coupled waveguide comprising a substantially uniform spatial grating profile.

5. A system as claimed in claim 1 wherein the light directing section is configured to direct variable wavelength input light toward the optical vector generator as a substantially planar wave front comprising a substantially uniform propagation vector profile.

6. A system as claimed in claim 5 wherein the grating coupled waveguide is configured to exhibit the reflective or transmissive optical resonance effect at the angle of incidence defined by the uniform variable propagation vector profile of the variable wavelength input light.

7. A system as claimed in claim 5 wherein the optical vector generator comprises a grating coupled waveguide comprising a spatial grating profile that varies as a function of position along a dimension of the waveguide.

8. A system as claimed in claim 7 wherein the spatial grating profile that varies as a function of position along a dimension of the waveguide is provided by a chirped grating, where the period of the grating varies across a dimension of the optical vector generator, a thickness modified grating, where effective index variations are incorporated into the grating structure by modifying the thickness of the waveguide portion of the grating coupled waveguide along a dimension of the optical vector generator, or a non-parallel grating, where the grating period is varied by incorporating non-parallel grating lines along a dimension of the optical vector generator.

9. A system as claimed in claim 1 wherein the system further comprises a wavelength-tunable light source configured to generate the light, at least a portion of which is directed towards the optical vector generator, and a wavelength conversion device positioned in the optical path of the light generated by the light source.

10. A system as claimed in claim 9 wherein the wavelength-tunable light source, the light directing section, the optical vector generator, and the position sensitive detector are contained within a common housing, as a portable unit.

11. A system as claimed in claim 9 wherein the optical path of the system, measured from the wavelength-tunable light source to the wavelength conversion device, and including the optical vector generator and the position sensitive detector, is less than approximately 100 mm.

12. A system as claimed in claim 1 wherein the light directing section, the optical vector generator, and the position sensitive detector contribute less than approximately 50 mm to overall optical path length of the system.

13. A system as claimed in claim 1 wherein the system further comprises a wavelength-tunable light source configured to generate the light, at least a portion of which is directed towards the optical vector generator.

14. A system as claimed in claim 13 wherein the system further comprises a controller configured to tune the wavelength-tunable light source at least partially in response to the signal generated by the position sensitive detector.

15. A system as claimed in claim 14 wherein the system is configured to operate as a visible light source comprised within a laser projection system.

16. A system as claimed in claim 1 wherein the system further comprises a wavelength conversion device positioned in the optical path of the light generated by the light source.

17. A system as claimed in claim 16 wherein the system further comprises a controller configured to tune a conversion bandwidth of the wavelength conversion device in response to the signal generated by the position sensitive detector.

18. A system as claimed in claim 1 wherein:
   the system further comprises a wavelength-tunable light source and a wavelength conversion device positioned in the optical path of the light generated by the light source; and
   the light directing section is configured to direct at least a portion of light generated by the wavelength tunable light source, upstream or downstream of the wavelength conversion device, toward the optical vector generator as native wavelength or frequency-converted input light.

19. A system as claimed in claim 1 wherein the signal generated by the position sensitive detector is derived from a signal indicative of a position of the wavelength-dependent output vector on an input face of the position sensitive detector.

* * * * *